US012657588B2

(12) United States Patent
Padiyar et al.

(10) Patent No.: US 12,657,588 B2
(45) Date of Patent: Jun. 16, 2026

(54) ENHANCED FACIAL AUTHENTICATION BASED ON MICROELECTROMECHANICAL SYSTEMS

(71) Applicant: Bank of America Corporation, Charlotte, NC (US)

(72) Inventors: Sneha Padiyar, Mumbai (IN); Hariharan Balakrishnan, Chennai (IN); Maneesh Kumar Sethia, Hyderabad (IN); Abhijit Behera, Hyderabad (IN); Sakthi Priya, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 13 days.

(21) Appl. No.: 18/748,565

(22) Filed: Jun. 20, 2024

(65) Prior Publication Data

US 2025/0390873 A1      Dec. 25, 2025

(51) Int. Cl.
| | |
|---|---|
| *G06Q 20/40* | (2012.01) |
| *G06V 20/52* | (2022.01) |
| *G06V 40/16* | (2022.01) |

(52) U.S. Cl.
CPC ....... *G06Q 20/40145* (2013.01); *G06V 20/52* (2022.01); *G06V 40/172* (2022.01)

(58) Field of Classification Search
CPC .............................................. G06Q 20/40145
See application file for complete search history.

(56) References Cited

U.S. PATENT DOCUMENTS

| | | | | |
|---|---|---|---|---|
| 6,054,335 | A | * | 4/2000 | Sun ..................... H01S 5/18308 |
| | | | | 310/40 MM |
| 7,770,784 | B2 | | 8/2010 | Silverbrook et al. |
| 8,322,612 | B2 | | 12/2012 | Silverbrook et al. |
| 8,554,685 | B2 | | 10/2013 | Patterson et al. |
| 10,175,489 | B1 | | 1/2019 | Robbins et al. |
| 10,187,748 | B2 | | 1/2019 | Skaaksrud |
| 10,425,409 | B2 | | 9/2019 | Lee et al. |
| 10,510,077 | B2 | | 12/2019 | Davis |
| 10,810,449 | B2 | | 10/2020 | Kim et al. |
| 10,963,834 | B1 | * | 3/2021 | Thurston ............ G06Q 30/0633 |

(Continued)

FOREIGN PATENT DOCUMENTS

| | | | | |
|---|---|---|---|---|
| CA | 2982605 | C | * 1/2018 | ......... G06Q 30/0222 |

*Primary Examiner* — Scott C Anderson

(57) ABSTRACT

A system for user authentication during a first session receives first images depicting a first user from first cameras deployed across an environment, determines a first user identity of the first user, transmits the first user identity to microelectromechanical devices deployed across the environment, determines items are selected by the first user based on signals from the microelectromechanical devices, generates a first user profile including the item identifications of the selected items, annotates the first user profile with the first user identity and a first session identifier of the first session, receives an authentication request at an authentication device for an interaction associated with the first user profile, accesses second images depicting a user face from second cameras of the authentication device, determines a second user identity of the user face, and approves the interaction if second user identity matches the first user identity or declines the interaction if otherwise.

20 Claims, 3 Drawing Sheets

(56)  References Cited

U.S. PATENT DOCUMENTS

| | | | | |
|---|---|---|---|---|
| 11,017,399 | B2 | 5/2021 | Park et al. | |
| 11,182,791 | B2 | 11/2021 | Vohra et al. | |
| 11,704,939 | B2 | 7/2023 | Hamid et al. | |
| 2012/0078783 | A1 | 3/2012 | Park | |
| 2013/0275309 | A1 | 10/2013 | Kwong | |
| 2014/0222596 | A1 | 8/2014 | S | |
| 2016/0165409 | A1* | 6/2016 | Bulut | H04W 4/06 |
| | | | | 715/734 |
| 2018/0032712 | A1 | 2/2018 | Oh et al. | |
| 2021/0166242 | A1 | 6/2021 | Ross | |
| 2021/0174778 | A1 | 6/2021 | Goldstein | |
| 2023/0073805 | A1* | 3/2023 | Siau | G06V 20/52 |
| 2023/0307123 | A1 | 9/2023 | LeBoeuf et al. | |
| 2023/0368206 | A1* | 11/2023 | Turgeman | G06F 21/32 |
| 2024/0221414 | A1* | 7/2024 | Wells | G06V 30/40 |
| 2024/0281811 | A1* | 8/2024 | Meikle, Sr. | G06Q 30/0215 |

* cited by examiner

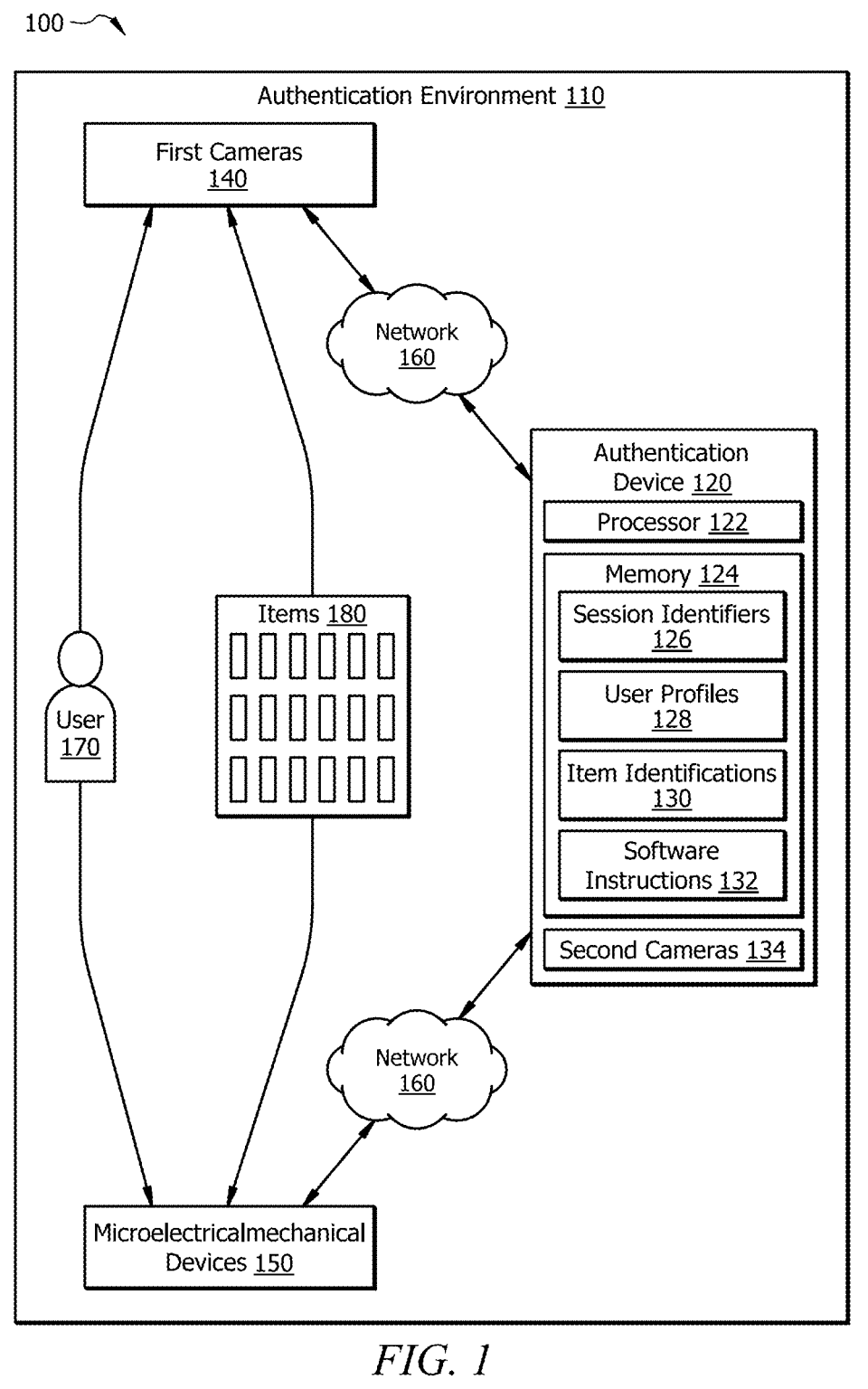

100 —

Authentication Environment 110

First Cameras
140

Network
160

Authentication
Device 120

Processor 122

Memory 124

Session Identifiers
126

User Profiles
128

Item Identifications
130

Software
Instructions 132

Second Cameras 134

Items 180

User
170

Network
160

Microelectricalmechanical
Devices 150

*FIG. 1*

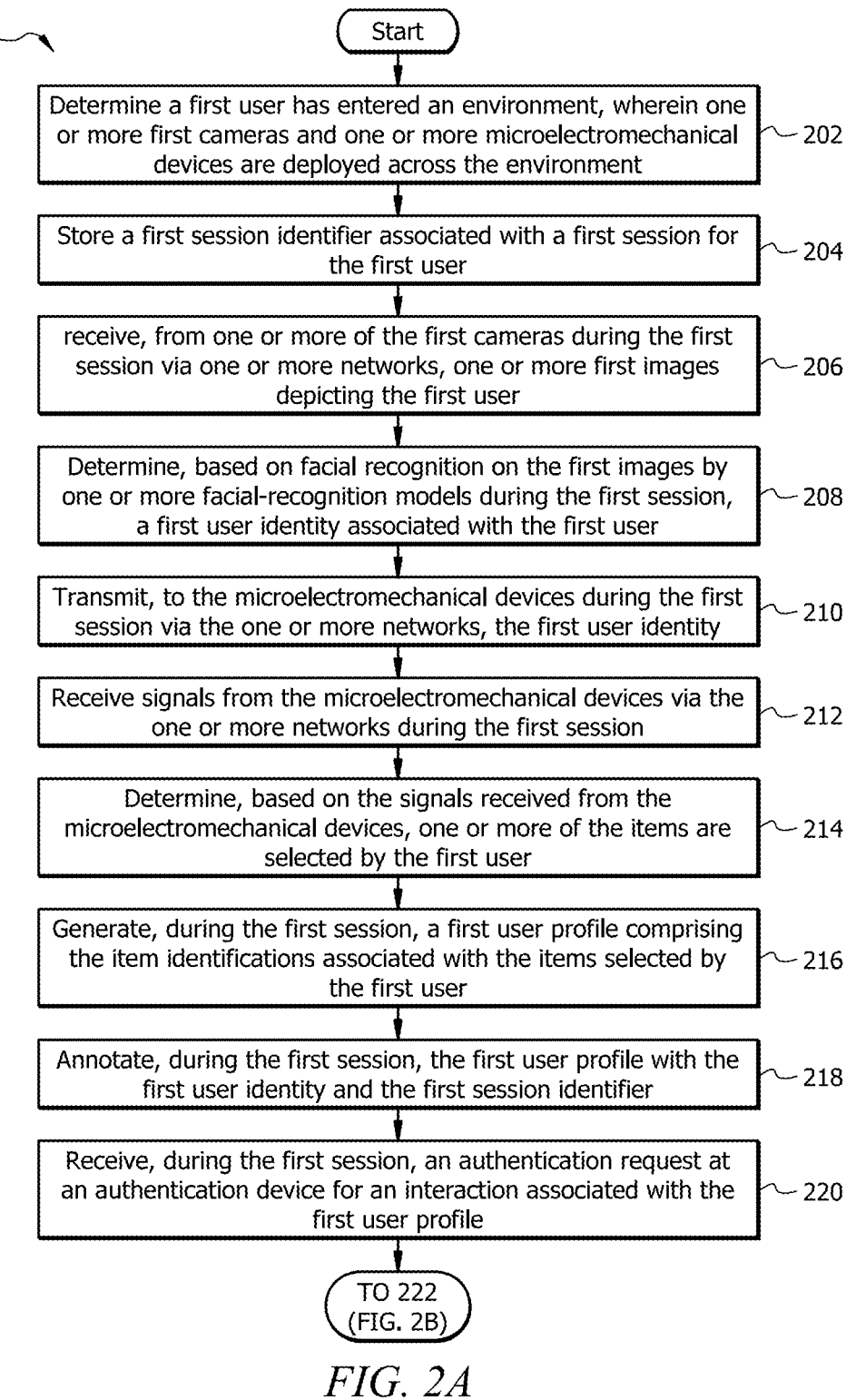

200

Start

Determine a first user has entered an environment, wherein one or more first cameras and one or more microelectromechanical devices are deployed across the environment —202

Store a first session identifier associated with a first session for the first user —204 receive, from one or more of the first cameras during the first session via one or more networks, one or more first images depicting the first user —206

Determine, based on facial recognition on the first images by one or more facial-recognition models during the first session, a first user identity associated with the first user —208

Transmit, to the microelectromechanical devices during the first session via the one or more networks, the first user identity —210

Receive signals from the microelectromechanical devices via the one or more networks during the first session —212

Determine, based on the signals received from the microelectromechanical devices, one or more of the items are selected by the first user —214

Generate, during the first session, a first user profile comprising the item identifications associated with the items selected by the first user —216

Annotate, during the first session, the first user profile with the first user identity and the first session identifier —218

Receive, during the first session, an authentication request at an authentication device for an interaction associated with the first user profile —220

ENHANCED FACIAL AUTHENTICATION BASED ON MICROELECTROMECHANICAL SYSTEMS

TECHNICAL FIELD

The present disclosure relates generally to biometric authentication, and more specifically, to facial authentication using facial recognition and microelectromechanical devices.

BACKGROUND

Biometric authentication, e.g., facial authentication, is common these days as one of the modes of authentication. However, there can be chances of misuses of biometric authentication in a variety of settings. For example, a user who is supposed to be authenticated through their facial identifier using facial recognition may move away at the time of authentication while the authentication is considered completed because a nearby person whose facial identifier is authenticated. Misuses of biometric authentication in scenarios like the above example could create authentication problems.

SUMMARY

The system disclosed in the present application provides a technical solution to the problems discussed above. One embodiment of the disclosed system can enhance facial authentication for interaction processing by utilizing IoT cameras and microelectromechanical devices deployed in different places across an environment. When a user enters the environment, the IoT camera captures visual data of the user and performs facial recognition to determine the user's identity. The user's identity is provided to the microelectromechanical devices, which monitor different items in the environment. While the user selects certain items, the microelectromechanical devices tag them with the user's identity. When the user initiates an interaction associated with the items at an authentication device, the authentication device determines the user's identity again and compares it with the identity tagged to the items. If the determined identity matches the identity tagged to the items, the authentication device authenticates the interaction. If the determined identity does not match the identity tagged to the items, the authentication device declines the interaction. Optionally, the authentication device can further utilize a provenance detector to determine if a real user is initiating the interaction and declines the interaction if it is not a real user.

In one embodiment, the disclosed system for user authentication in an environment includes one or more first cameras deployed across the environment. The first cameras are configured to capture visual data in the environment from a plurality of views. The disclosed system also includes one or more microelectromechanical devices deployed across the environment. The microelectromechanical devices are configured to detect activities in the environment. The disclosed system further includes an authentication device. The authentication device includes one or more second cameras configured to capture visual data in a field of view of the authentication device. The authentication device also includes a memory operable to store session identifiers, user profiles, and item identifications associated with a plurality of items. The authentication device further includes a processor operably coupled to the second cameras and the memory. The processor is configured to store, in the memory, a first session identifier associated with a first session for a first user upon determining the first user has entered the environment. The processor is then configured to receive, from one or more of the first cameras during the first session via one or more networks, one or more first images depicting the first user. The processor is then configured to determine, based on facial recognition on the first images by one or more facial-recognition models during the first session, a first user identity associated with the first user. The processor is then configured to transmit, to the microelectromechanical devices during the first session via the one or more networks, the first user identity. The processor is then configured to determine, based on signals received from the microelectromechanical devices via the one or more networks during the first session, one or more of the items are selected by the first user. The processor is then configured to generate, during the first session, a first user profile comprising the item identifications associated with the items selected by the first user. The processor is then configured to annotate, during the first session, the first user profile with the first user identity and the first session identifier, wherein the first user profile is stored in the memory. The processor is then configured to receive, during the first session, an authentication request at the authentication device for an interaction associated with the first user profile. The processor is then configured to access, from the one or more second cameras during the first session, one or more second images depicting a user face. The processor is then configured to determine, based on facial recognition on the second images by the facial-recognition models during the first session, a second user identity associated with the user face. The processor is further configured to determine, during the first session, whether the second user identity matches the first user identity. Based on determining whether the second user identity matches the first user identity during the first session, the processor is configured to approve the interaction if second user identity matches the first user identity or decline the interaction if the second user identity does not match the first user identity.

The processor of the disclosed system is further configured to determine whether the user face is a deepfake face based on an analysis of the second images by a provenance detection model. The provenance detection model is configured to analyze facial characteristics associated with images captured by cameras to determine whether the images depict deepfake faces. Based on determining whether the user face is a deepfake face, the processor is configured to approve the interaction if the user face is not a deepfake face or decline the interaction if the user face is a deepfake face. In one embodiment, the memory is further operable to store baseline facial characteristics representing live humans. Accordingly, the analysis of the second images by the provenance detection model includes comparing facial characteristics associated with the second images to the baseline facial characteristics. The facial characteristics can include one or more of an eye movement, a shadow under an eye, facial hair, or textured skin.

The processor of the disclosed system is further configured to determine whether the interaction is associated with prohibited interactions based on an analysis of the first user profile, the second images, and data associated with the interaction by a machine-learning model. The machine-learning model is configured to identify patterns corresponding to the prohibited interactions. Based on determining whether the interaction is associated with prohibited interactions, the processor is configured to approve the interaction if the interaction is not associated with prohibited interactions or decline the interaction if the interaction is associated with prohibited interactions.

In one embodiment, the signals from the microelectromechanical devices include one or more of a pressure signal, a magnetism signal, an electrostatics signal, a physical load signal, an acceleration signal, a light signal, a vibration signal, or a chemical signal.

The processor of the disclosed system is further configured to determine, based on the signals received from the microelectromechanical devices via the one or more networks during the first session, one or more of the selected items are deselected by the first user. The processor of the disclosed system is then configured to update, during the first session, the first user profile by removing the item identifications corresponding to the deselected items.

The processor of the disclosed system is further configured to receive, from one or more of the first cameras via the one or more networks during the first session, one or more third images of the first user. In one embodiment, determining the one or more of the items are selected by the first user is further based on facial recognition on the third images by the one or more facial-recognition models.

The disclosed system and methods provide the practical application of enhancing facial authentication by jointly utilizing facial recognition and microelectromechanical devices. Prior systems may conduct facial authentication utilizing facial recognition only, which may result in misused or incorrect facial authentication for different tasks. The disclosed system and methods can address such problem by utilizing IoT cameras and microelectromechanical devices deployed in different places across an environment. As described in embodiments of the present disclosure, an authentication device analyzes images captured by IoT cameras using facial recognition to determine a user's identity upon the user entering the environment and passes the user's identity to the microelectromechanical devices. The microelectromechanical devices, together with the IoT cameras, track the user's activities with respect to different items, which can help the authentication device correlate the user's identity with items selected by the user. When the user initiates an interaction, the authentication device authenticates the user based on both facial recognition and verification of the user's correlation to the items, which ensures the right user is making the interaction to prevent misused or incorrect facial authentication. In addition, the authentication device uses a provenance detector to ensure a real user instead of a deepfake face is being presented for authentication.

Technical advantages of certain embodiments of this disclosure may include one or more of the following. By utilizing microelectromechanical devices, the disclosed system and methods can efficiently and thoroughly monitor an environment as the microelectromechanical devices offer convenience (compact size and lightweight), flexibility (possibility to use in hard-to-reach places), and improved performance. By jointly utilizing facial recognition and microelectromechanical devices, the disclosed system and methods can enhance user data security by authenticating the user's biometric data against tracking information associated with the user to prevent user data from being misused.

Thus, the disclosed system and methods generally improve the technology associated with biometric authentication.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates an example system configured for facial authentication using facial recognition and microelectromechanical devices; and FIGS. 2A-2B illustrate an example flowchart of a method for facial authentication using facial recognition and microelectromechanical devices.

DETAILED DESCRIPTION

Figure 2B:
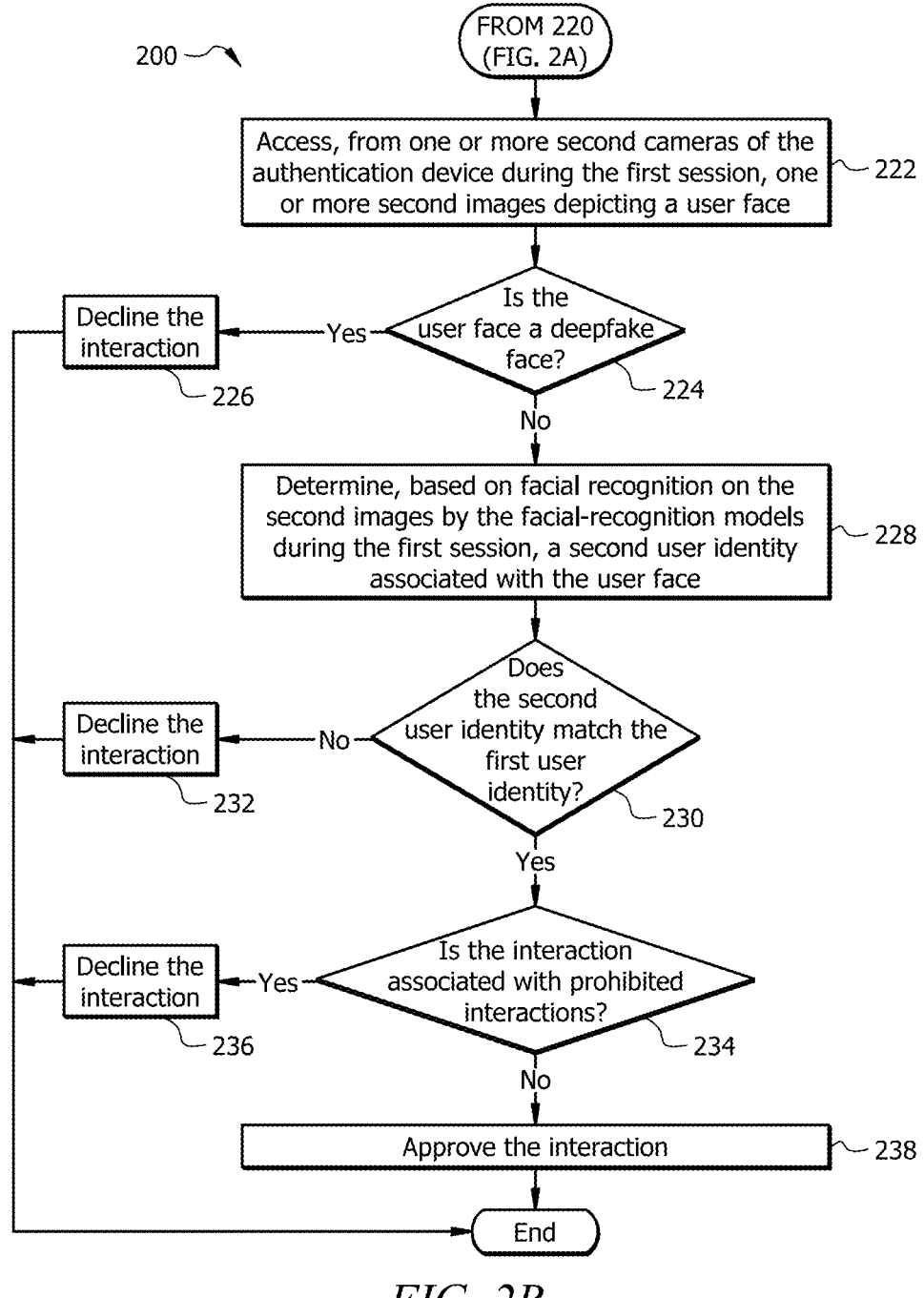

As described above, previous technologies fail to resolve the issue of misuses of facial authentications. This disclosure provides various systems and methods to prevent misuses of facial authentications by using facial recognition and microelectromechanical devices. FIG. 1 illustrates a system 100 configured for facial authentication using facial recognition and microelectromechanical devices. FIGS. 2A-2B illustrate an example flowchart of a method for facial authentication using facial recognition and microelectromechanical devices.

Example System for Facial Authentications

FIG. 1 illustrates one embodiment of a system 100 that is configured for facial authentication using facial recognition and microelectromechanical devices. In some embodiments, system 100 may be implemented in an authentication environment 110. System 100 comprises an authentication device 120. In some embodiments, system 100 further comprises one or more first cameras 140 and microelectromechanical devices 150 deployed across the authentication environment 110, and a network 160. Network 160 enables communications among components of the system 100. A user 170 and a plurality of items 180 may be present in the authentication environment 110. User 170 is the target for facial authentication. In other embodiments, system 100 may not have all of the components listed and/or may have other elements instead of, or in addition to, those listed above.

System Components

Authentication Device

Authentication device 120 is generally any device that is configured to process data and communicate with devices (e.g., cameras 140 and microelectromechanical devices 150), databases, systems, etc., via the network 160. Authentication device 120 is generally configured to perform operations described further below in conjunction with method 200 described in FIGS. 2A-2B. In an embodiment, authentication device 120 comprises a processor 122 in signal communication with a memory 124. Authentication device 120 can also comprise one or more second cameras 134 configured to capture visual data in a field of view of the authentication device 120.

Processor 122 comprises one or more processors operably coupled to the memory 124. Processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 122 may be a programmable logic device, a microcontroller, a microprocessor, or any suitable combination of the preceding. Processor 122 is communicatively coupled to and in signal communication with a network interface associated with network 160 and memory 124. The one or more processors 122 are configured to process data. For example, the processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches software instructions 132 from memory 124 and executes them by directing the coordinated operations of the ALU, registers and other components. The one or more processors 122 are configured to implement various software instructions 132. For example, the one or more processors 122 are configured to execute software instructions 132 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. Memory 124 is operable to store session identifiers for different authentication sessions, user profiles 128 for different users 170, item identifications 130 associated with the items 180. Memory 124 also stores the software, and/or any other data or software instructions 132. The software instructions 132 may comprise any suitable set of instructions, logic, rules, or code operable to execute the processor 122. The software instructions 132, when executed by the processor 122, cause the processor 122 to perform one or more functions described herein. For example, when the software instructions 132 are executed, the processor 122 executes the software instructions 132 to conduct facial authentication for interaction processing by utilizing data from cameras 140 and microelectromechanical devices 150.

First Cameras

The first cameras 140 may be any suitable type of cameras. In an embodiment, the first cameras 140 are Internet of Things (IoT) cameras connected via the network 160. and are used to provide security measures. The IoT cameras can be controlled remotely through a mobile application, web-based interface or any proprietary installed software. The IoT cameras can provide real-time video monitoring of the authentication environment 110, allowing to view footage remotely from the interface.

Microelectromechanical Devices

Microelectromechanical devices 150 are microscopic devices incorporating both electronic and moving parts. A smart dust system can be made up of many tiny microelectromechanical devices 150 distributed over some area (e.g., authentication environment 110) that autonomously collect and transmit data from their environment in real time over a wireless network (e.g., network 160). The small size and lightweight of microelectromechanical devices 150 allow them to suspend in the air like dust, hence the name smart dust. Microelectromechanical devices 150 of smart dust measure at one cubic millimeter or less. Microelectromechanical devices 150 of smart dust remain in continuous communication with one another and report back to a central unit that processes data (e.g., processor 122) via the wireless network.

Microelectromechanical devices 150 can interact with the surroundings based on forces produced by ambient electromagnetism (e.g., electrostatic charges and magnetic moments), fluid dynamics (e.g., surface tension and viscosity), and other types of signals. Microelectromechanical devices 150 can detect external stimuli such as light, movement, sound, chemicals and air pressure in real time.

When deployed across the authentication environment, microelectromechanical devices 150 may use radio frequency transceivers to wirelessly communicate with one another, and independently gather information to report back findings to processor 122. In an embodiment, the information can include the activities (e.g., picking up or dropping off by user 170) with respect to the items 180 in the authentication environment 110.

Network

Network 160 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. Network 160 may be configured to support any suitable type of communication protocol as would be appreciated by one of ordinary skill in the art.

Operational Flow for Facial Authentication

When user 170 enters the authentication environment 110, one or more of the first cameras 140 capture images of the user 170 and transmit the captured images to processor 122 via network 160. In an embodiment, processor 122 stores a first session identifier 126 associated with a first session for user 170 in memory 124 upon determining user 170 has entered the authentication environment 110. Processor 122 then determines a first user identity associated with user 170 based on facial recognition on the images by one or more facial-recognition models during the first session. Processor 122 further transmits the first user identity to the microelectromechanical devices 150 during the first session via network 160.

Microelectromechanical devices 150 monitor areas where the items 180 are located at. Microelectromechanical devices 150 may transmit signals associated with the monitoring to processor 122 via network 160. As an example and not by way of limitation, the signals from the microelectromechanical devices comprise one or more of a pressure signal, a magnetism signal, an electrostatics signal, a physical load signal, an acceleration signal, a light signal, a vibration signal, or a chemical signal. Microelectromechanical devices 150 are capable of tracking all selections or deselections of items 180 by user 170.

In an embodiment, processor 122 determines one or more of the items 180 are selected by user 170 based on the signals received from the microelectromechanical devices 150. Processor 122 then generates a first user profile 128 comprising the item identifications 130 associated with the items 180 selected by user 170. Processor 122 further annotates the first user profile 128 with the first user identity and the first session identifier 126. Processor 122 stores the first user profile 128 in memory 124. In some embodiments, processor 122 receives additional images of user 170 from one or more of the first cameras 140 via network 160. Processor 122 may determine the one or more of the items 180 are selected by user 170 further based on facial recognition on these images by the facial-recognition models. In other words, processor 122 may verify it is user 170 who selected the items 180 based on facial recognition. In some embodiments, processor 122 determines one or more of the selected items 180 are deselected by user 170 based on the signals received from the microelectromechanical devices 150. Accordingly, processor 122 updates the first user profile 128 by removing the item identifications 130 corresponding to the deselected items 180.

When user 170 reaches the authentication device 120 and initiates an interaction, the authentication device 120 authenticates user 170 with the annotated profile 128 including item identifications 130 of the selected items 180. In an embodiment, processor 122 receives an authentication request at the authentication device 120 for an interaction associated with the first user profile 128. Processor 122 then access images depicting a user face from the second cameras 134. Processor 122 then determines a second user identity associated with the user face based on facial recognition on the images by the facial-recognition models. Processor 122 then determines whether the second user identity matches the first user identity. If second user identity matches the first user identity, processor 122 approves the interaction. Otherwise, processor 122 declines the interaction.

In some embodiments, processor 122 may utilize a provenance detection model as a second level of verification to ensure real user is conducting the interaction instead of an AI-generated image/video being presented to the authenticate device 120 for the interaction. Processor 122 may determine whether the user face is a deepfake face based on an analysis of the images from the second cameras 134 by a provenance detection model. The provenance detection model is configured to analyze facial characteristics associated with images captured by cameras to determine whether the images depict deepfake faces. As an example and not by way of limitation, the facial characteristics include one or more of an eye movement, a shadow under an eye, facial hair, or textured skin. Memory 124 may store baseline facial characteristics representing live humans. Processor 122 may use the provenance detection model to compare facial characteristics associated with the images from the second cameras 134 to the baseline facial characteristics. If processor 122 determines the user face is a deepfake face, processor 122 also declines the interaction.

In some embodiments, processor 122 may utilize a smart AI model (e.g., a machine-learning model) to determine whether the interaction is associated with prohibited interactions based on an analysis of the first user profile 128, the second images, and data associated with the interaction. The smart AI model is configured to identify patterns corresponding to the prohibited interactions. If the smart AI model determines the interaction is associated with prohibited interactions, processor 122 also declines the interaction.

In one example embodiment, the system 100 described above may be used to tackle misuse of facial authentication-based payment transactions. When a user 170 enters the authentication environment 110 (e.g., a store), the first cameras 140 captures the images of the user 170 and the processor 122 determines the user identify based on the captured images. The microelectromechanical devices 150 track items 180 (e.g., products) selected by the user 170. Processor 122 generates a user profile 128 (e.g., an e-shopping cart) containing the item identifications 130 (e.g., barcode) of the selected items 180 and tag them with the user's 170 identity. When the user 170 proceeds to payment at the authentication device 120 (e.g., a payment kiosk), the authentication device 120 captures the user's facial images again and authenticates the user identity determined from these images against the user identify tagged to the products. The authentication device 120 approves the payment if the user authentication is successful and declines the payment otherwise.

Example Method for Facial Authentications

FIGS. 2A-2B illustrate an example flowchart of a method 200 for facial authentication using facial recognition and microelectromechanical devices. Modifications, additions, or omissions may be made to method 200. Method 200 may include more, fewer, or other steps. For example, steps may be performed in parallel or in any suitable order. While at times discussed as system 100, authentication device 120, processor 122, first cameras 140, microelectromechanical devices 150 or components of any of thereof performing steps, any suitable system or components of the system may perform one or more steps of the method 200. For example, one or more steps of method 200 may be implemented, at least in part, in the form of software instructions (e.g., software instructions 132 of FIG. 1), stored on non-transitory, tangible, machine-readable media (e.g., memory 124 of FIG. 1) that when run by one or more processors (e.g., processor 122 of FIG. 1) may cause the one or more processors to perform steps 202-238.

Now referring to FIG. 2A, after start, processor 122 of the authentication device 120 determines a first user 170 has entered an environment 110 at operation 202. One or more first cameras 140 and one or more microelectromechanical devices 150 are deployed across the environment 110.

At operation 204, processor 122 stores a first session identifier 126 associated with a first session for the first user 170 in memory 124.

At operation 206, processor 122 receives, from one or more of the first cameras 140 during the first session via one or more networks 160, one or more first images depicting the first user 170.

At operation 208, processor 122 determines, based on facial recognition on the first images by one or more facial-recognition models during the first session, a first user identity associated with the first user 170.

At operation 210, processor 122 transmits, to the microelectromechanical devices 150 during the first session via the one or more networks 160, the first user identity.

At operation 212, processor 122 receives signals from the microelectromechanical devices 150 via the one or more networks 160 during the first session.

At operation 214, processor 122 determines, based on the signals received from the microelectromechanical devices 150, one or more of the items 180 are selected by the first user 170.

At operation 216, processor 122 generates, during the first session, a first user profile 128 comprising the item identifications 130 associated with the items 180 selected by the first user 170.

At operation 218, processor 122 annotates, during the first session, the first user profile 128 with the first user identity and the first session identifier 126.

At operation 220, processor 122 receives, during the first session, an authentication request at an authentication device 120 for an interaction associated with the first user profile 128.

Now referring to FIG. 2B, at operation 222, processor 122 accesses, from one or more second cameras 134 of the authentication device 120 during the first session, one or more second images depicting a user face.

At operation 224, processor 122 determines whether the user face is a deepfake face. If the user face is a deepfake face, processor 122 declines the interaction at operation 226. Method 200 then ends. If the user face is not a deepfake face, method 200 proceeds to operation 228.

At operation 228, processor 122 determines, based on facial recognition on the second images by the facial-recognition models during the first session, a second user identity associated with the user face.

At operation 230, processor 122 determines whether the second user identify matches the first user identity. If the second user identity does not match the first user identity, processor 122 declines the interaction at operation 232. Method 200 then ends. If the second user identity matches the first user identity, method 200 proceeds to operation 234.

At operation 234, processor 122 determines whether the interaction is associated with prohibited interactions. If the interaction is associated with prohibited interactions, processor 122 declines the interaction at operation 236. Method 200 then ends. If the interaction is not associated with prohibited interactions, method 200 proceeds to operation 238.

At operation 238, processor 122 approves the interaction. Method 200 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for user authentication in an environment, comprising:

one or more first cameras deployed across the environment, wherein the first cameras are configured to capture visual data in the environment from a plurality of views;

a plurality of microelectromechanical devices deployed in different places across the environment, wherein the microelectromechanical devices are configured to detect activities in different places across the environment; and an authentication device configured to conduct facial authentication for interaction processing, the authentication device comprising:

one or more second cameras configured to capture real-time video in a field of view of the authentication device;

a memory operable to store session identifiers, user profiles, and item identifications associated with a plurality of items located within the environment;

a processor operably coupled to the second cameras and the memory, the processor being configured to:

store, in the memory, a first session identifier associated with a first session for a first user upon determining the first user has entered the environment;

receive, from one or more of the first cameras during the first session via one or more networks, one or more first images depicting the first user;

determine in real time, based on facial recognition on the first images by one or more facial-recognition models during the first session, a first user identity associated with the first user;

transmit, to the microelectromechanical devices during the first session via the one or more networks, the first user identity;

use signals from the microelectromechanical devices via the one or more networks during the first session to track activities of the first user in the environment, and wherein the signals are generated by the microelectromechanical devices responsive to interactions with the first user and the items based on forces generated by at least ambient electromagnetism and fluid dynamics;

determine in real time, based on the signals received from the microelectromechanical devices, the activities associated with the first user comprise selecting one or more first items of the plurality of items by the first user;

generate, during the first session, tracking information associated with the first user, wherein the tracking information comprises the first user identity, the item identifications associated with the items selected by the first user, and a correlation between the first user identity and the item identifications associated with the first items, wherein the tracking information is stored in the memory;

detect, during the first session, a user face is presented at the authentication device as an authentication request for an interaction associated with the first items;

access, from the memory, the tracking information;

determine, from the tracking information, the first user identity has a correlation with the item identifications associated with the first items;

access, from the one or more second cameras during the first session, one or more second images depicting the user face;

determine in real time, based on facial recognition on the second images by the facial-recognition models during the first session, a second user identity associated with the user face;

determine, during the first session, whether the second user identity matches the first user identity; and

based on determining whether the second user identity matches the first user identity during the first session:

if the second user identity matches the first user identity:

approve the interaction; else if the second user identity does not match the first user identity:

decline the interaction.

2. The system of claim 1, wherein the processor is further configured to:

determine whether the user face is a fake face based on an analysis of the second images by a provenance detection model, the provenance detection model being configured to analyze facial characteristics associated with images captured by cameras to determine whether the images depict fake faces; and based on determining whether the user face is a fake face:

if the user face is not a fake face:

approve the interaction; else if the user face is a fake face:

decline the interaction.

3. The system of claim 2, wherein the memory is further operable to store baseline facial characteristics representing live humans, and wherein the analysis of the second images by the provenance detection model comprises comparing facial characteristics associated with the second images to the baseline facial characteristics.

4. The system of claim 2, wherein the facial characteristics comprise one or more of an eye movement, a shadow under an eye, facial hair, or textured skin.

5. The system of claim 1, wherein the processor is further configured to:

determine whether the interaction is associated with prohibited interactions based on an analysis of the tracking information, the second images, and data associated with the interaction by a machine-learning model, the machine-learning model being configured to identify patterns corresponding to the prohibited interactions; and based on determining whether the interaction is associated with prohibited interactions:

if the interaction is not associated with prohibited interactions:

approve the interaction; else if the interaction is associated with prohibited interactions:

decline the interaction.

6. The system of claim 1, wherein the signals from the microelectromechanical devices comprise one or more of a pressure signal, a magnetism signal, an electrostatics signal, a physical load signal, an acceleration signal, a light signal, a vibration signal, or a chemical signal.

7. The system of claim 1, wherein the processor is further configured to:

determine, based on the signals received from the microelectromechanical devices via the one or more networks during the first session, one or more of the first items are deselected by the first user; and update, during the first session, the tracking information by removing item identifications corresponding to the deselected items.

8. The system of claim 1, wherein the processor is further configured to:

receive, from one or more of the first cameras via the one or more networks during the first session, one or more third images of the first user;

wherein determining the activities associated with the first user comprise selecting the one or more first items is further based on facial recognition on the third images by the one or more facial-recognition models.

9. A method for authentication in an environment comprising, by one or more computing systems:

storing, in a memory, a first session identifier associated with a first session for a first user upon determining the first user has entered the environment;

receiving, from one or more of first cameras deployed across the environment during the first session via one or more networks, one or more first images depicting the first user, wherein the first cameras are configured to capture visual data in the environment from a plurality of views;

determining in real time, based on facial recognition on the first images by one or more facial-recognition models during the first session, a first user identity associated with the first user;

transmitting, to microelectromechanical devices deployed in different places across the environment during the first session via the one or more networks, the first user identity, wherein the microelectromechanical devices are configured to detect activities in different places across the environment;

using signals from the microelectromechanical devices via the one or more networks during the first session to track activities of the first user in the environment, and wherein the signals are generated by the microelectromechanical devices responsive to interactions with the first user and the items based on forces generated by at least ambient electromagnetism and fluid dynamics;

determining in real time, based on the signals received from the microelectromechanical devices, the activities associated with the first user comprise selecting one or more first items of the plurality of items by the first user;

generating, during the first session, tracking information associated with the first user, wherein the tracking information comprises the first user identity, the item identifications associated with the items selected by the first user, and a correlation between the first user identity and the item identifications associated with the first items, , wherein the tracking information is stored in the memory;

detecting, during the first session, a user face is presented at an authentication device as an authentication request for an interaction associated with the first items, wherein the authentication device is configured to conduct facial authentication for interaction processing;

accessing, from the memory, the tracking information;

determining, from the tracking information, the first user identity has a correlation with the item identifications associated with the first items;

accessing, from one or more second cameras associated with the authentication device during the first session, one or more second images depicting the user face, wherein the second cameras are configured to capture real-time video in a field of view of the authentication device;

determining in real time, based on facial recognition on the second images by the facial-recognition models during the first session, a second user identity associated with the user face;

determining, during the first session, whether the second user identity matches the first user identity; and based on determining whether the second user identity matches the first user identity during the first session:

if the second user identity matches the first user identity:

approving the interaction; else if the second user identity does not match the first user identity:

declining the interaction.

10. The method of claim 9, further comprising:

determining whether the user face is a fake face based on an analysis of the second images by a provenance detection model, the provenance detection model being configured to analyze facial characteristics associated with images captured by cameras to determine whether the images depict fake faces; and based on determining whether the user face is a fake face:

if the user face is not a fake face:

approving the interaction; else if the user face is a fake face:

declining the interaction.

11. The method of claim 10, wherein the analysis of the second images by the provenance detection model comprises comparing facial characteristics associated with the second images to baseline facial characteristics representing live humans.

12. The method of claim 10, wherein the facial characteristics comprise one or more of an eye movement, a shadow under an eye, facial hair, or textured skin.

13. The method of claim 9, further comprising:

determining whether the interaction is associated with prohibited interactions based on an analysis of the tracking information, the second images, and data associated with the interaction by a machine-learning model, the machine-learning model being configured to identify patterns corresponding to the prohibited interactions; and based on determining whether the interaction is associated with prohibited interactions:

if the interaction is not associated with prohibited interactions:

approving the interaction; else if the interaction is associated with prohibited interactions:

declining the interaction.

14. The method of claim 9, further comprising:

determining, based on the signals received from the microelectromechanical devices via the one or more networks during the first session, one or more of the first items are deselected by the first user; and updating, during the first session, the tracking information by removing item identifications corresponding to the deselected items.

15. The method of claim 9, further comprising:

receiving, from one or more of the first cameras via the one or more networks during the first session, one or more third images of the first user;

wherein determining the activities associated with the first user comprise selecting the one or more first items is further based on facial recognition on the third images by the one or more facial-recognition models.

16. A non-transitory computer-readable medium storing instructions that when executed by a processor cause the processor to:

store, in a memory, a first session identifier associated with a first session for a first user upon determining the first user has entered the environment;

receive, from one or more of first cameras deployed across the environment during the first session via one or more networks, one or more first images depicting the first user, wherein the first cameras are configured to capture visual data in the environment from a plurality of views;

determine in real time, based on facial recognition on the first images by one or more facial-recognition models during the first session, a first user identity associated with the first user;

transmit, to microelectromechanical devices deployed in different places across the environment during the first session via the one or more networks, the first user identity, wherein the microelectromechanical devices are configured to detect activities in different places across the environment;

use signals from the microelectromechanical devices via the one or more networks during the first session to track activities of the first user in the environment, and wherein the signals are generated by the microelectromechanical devices responsive to interactions with the first user and the items based on forces generated by at least ambient electromagnetism and fluid dynamics;

determine in real time, based on the signals received from the microelectromechanical devices, the activities associated with the first user comprise selecting one or more first items of the plurality of items by the first user;

generate, during the first session, tracking information associated with the first user, wherein the tracking information comprises the first user identity, the item identifications associated with the items selected by the first user, and a correlation between the first user identity and the item identifications associated with the first items, wherein the tracking information is stored in the memory;

detect, during the first session, a user face is presented at an authentication device as an authentication request for an interaction associated with the first items, wherein the authentication device is configured to conduct facial authentication for interaction processing;

access, from the memory, the tracking information;

determine, from the tracking information, the first user identity has a correlation with the item identifications associated with the first items;

access, from one or more second cameras associated with the authentication device during the first session, one or more second images depicting the user face, wherein the second cameras are configured to capture real-time video in a field of view of the authentication device;

determine in real time, based on facial recognition on the second images by the facial-recognition models during the first session, a second user identity associated with the user face;

determine, during the first session, whether the second user identity matches the first user identity; and based on determining whether the second user identity matches the first user identity during the first session:

if the second user identity matches the first user identity:

approve the interaction; else if the second user identity does not match the first user identity:

decline the interaction.

17. The non-transitory computer-readable medium of claim 16, wherein the instructions further cause the processor to:

determine whether the user face is a fake face based on an analysis of the second images by a provenance detection model, the provenance detection model being configured to analyze facial characteristics associated with images captured by cameras to determine whether the images depict fake faces; and based on determining whether the user face is a fake face:

if the user face is not a fake face:

approve the interaction; else if the user face is a fake face:

decline the interaction.

18. The non-transitory computer-readable medium of claim 16, wherein the instructions further cause the processor to:

determine whether the interaction is associated with prohibited interactions based on an analysis of the tracking information, the second images, and data associated with the interaction by a machine-learning model, the machine-learning model being configured to identify patterns corresponding to the prohibited interactions; and based on determining whether the interaction is associated with prohibited interactions:

if the interaction is not associated with prohibited interactions:

approve the interaction; else if the interaction is associated with prohibited interactions:

decline the interaction.

19. The non-transitory computer-readable medium of claim 16, wherein the instructions further cause the processor to:

determine, based on the signals received from the microelectromechanical devices via the one or more networks during the first session, one or more of the first items are deselected by the first user; and update, during the first session, the tracking information by removing item identifications corresponding to the deselected items.

20. The non-transitory computer-readable medium of claim 16, wherein the instructions further cause the processor to:

receive, from one or more of the first cameras via the one or more networks during the first session, one or more third images of the first user;

wherein determining the activities associated with the first user comprise selecting the one or more first items is further based on facial recognition on the third images by the one or more facial-recognition models.

\* \* \* \* \*